United States Patent
Dulay et al.

(10) Patent No.: US 7,323,350 B2
(45) Date of Patent: Jan. 29, 2008

(54) METHOD OF FABRICATING THIN FILM CALIBRATION FEATURES FOR ELECTRON/ION BEAM IMAGE BASED METROLOGY

(75) Inventors: Sukhbir Singh Dulay, San Jose, CA (US); Justin Jia-Jen Hwu, San Jose, CA (US); Thao John Pham, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 308 days.

(21) Appl. No.: 10/957,097

(22) Filed: Sep. 30, 2004

(65) Prior Publication Data

US 2006/0073618 A1 Apr. 6, 2006

(51) Int. Cl.
*H01L 21/00* (2006.01)
*H01L 23/58* (2006.01)

(52) U.S. Cl. ............... 438/10; 438/17; 257/48
(58) Field of Classification Search ........... 438/5, 438/7, 10, 11, 16, 17, 18; 257/48
See application file for complete search history.

(56) References Cited

U.S. PATENT DOCUMENTS

| | | | |
|---|---|---|---|
| 3,659,098 A * | 4/1972 | Politycki et al. | |
| 4,068,381 A * | 1/1978 | Ballard et al. | |
| 4,123,661 A * | 10/1978 | Wolf et al. | |
| 5,043,586 A * | 8/1991 | Giuffre et al. | |
| 5,169,488 A * | 12/1992 | Giuffre et al. | ................ 216/39 |
| 5,528,047 A * | 6/1996 | Nakajima | |
| 5,677,765 A * | 10/1997 | Laird et al. | ............... 356/237.5 |
| 6,218,264 B1 * | 4/2001 | Bartha et al. | ................ 438/401 |
| 6,239,590 B1 * | 5/2001 | Krivy et al. | ............. 324/158.1 |
| 6,358,860 B1 * | 3/2002 | Scheer et al. | ................ 438/745 |
| 6,420,702 B1 * | 7/2002 | Tripsas et al. | |
| 6,420,703 B1 * | 7/2002 | Wu et al. | |
| 6,632,722 B2 * | 10/2003 | Fujiwara et al. | |
| 6,646,737 B2 * | 11/2003 | Tortonese et al. | ............. 438/14 |

OTHER PUBLICATIONS

Electron Microscopy Sciences, "Calibration Equipment" Internet web page, http://www.emsdiasum.com/microscopy/products/sem/standards.aspx, copy printed on Jul. 19, 2004.*

* cited by examiner

*Primary Examiner*—Kevin M. Picardat
(74) *Attorney, Agent, or Firm*—G. Marlin Knight

(57) ABSTRACT

A method of making and using thin film calibration features is described. To fabricate a calibration standard according to the invention raised features are first formed from an electrically conductive material with a selected atomic number. A conformal thin film layer is deposited over the exposed sidewalls of the raised features. The sidewall material is selected to have a different atomic number and is preferably an nonconductive such as silicon dioxide or alumina. After the nonconductive material deposition, a controlled directional RIE process is used to remove the insulator layer deposited on the top and bottom surface of the lines and trenches. The remaining voids between the sidewalls of the raised features are filled with a conductive material. The wafer is then planarized with chemical mechanical planarization (CMP) to expose the nonconductive sidewall material on the surface. The nonconductive sidewall material will be fine lines embedded in conductive material.

12 Claims, 5 Drawing Sheets

METHOD OF FABRICATING THIN FILM CALIBRATION FEATURES FOR ELECTRON/ION BEAM IMAGE BASED METROLOGY

FIELD OF THE INVENTION

The invention relates to the field of manufacturing methods for thin films and more particularly to methods and structures for calibration of image-based measuring systems for thin film structures and even more particularly to methods and structures for calibration of image-based measuring devices for measuring thin film structures used in magnetic heads in data storage industry.

BACKGROUND OF THE INVENTION

The read and write head portions of the slider for use in a typical prior art magnetic disk recording system are built-up in layers using thin film processing techniques. In the typical process of fabricating thin film magnetic heads, a large number of heads are formed simultaneously on a wafer. After the basic structures are formed the wafer is cut into rows or individual heads called sliders.

The various photolithographic and thin film deposition and plating steps involved in the fabrication of a magnetic head require monitoring by precisely measuring thin film features formed on the wafer. Image-based metrology is typically performed using electron beam or ion beam systems. To maintain the precision and accuracy of measurements on these devices or systems, the image pixel dimension of a system is currently determined by measuring a pitch of a known or assigned dimension in the images of calibration wafers, but pitch structure is not reliable for pixel calibration due to ambiguous edge definition in the image. The ambiguity arises from a gradual contrast change. In addition a pitch standard does not provide calibration for angles.

Traditionally, a set of lines separated by a distance (pitch) is made on calibration wafers and used as reference features for calibration on electron beam and ion beam systems such as SEM, CD-SEM, failure review SEM and FIB. The lines are topographical in that they are raised above the surrounding surface. The lines are designed for fast electron/ion-beam scanning. It is sufficient for edge detection for dimensional measurement which does not require any information from a high quality image. However, the signal-to-noise ratio is low from quick electron/ion raster scans and the signals cannot be used to provide a high quality image for further dimensional and angular measurements required in data storage industry in which a high quality slow scan image is acquired with known image pixel dimension in the beginning of the measurement process. To use the current topographical pitch structure in slow scan imaging acquisition for image pixel dimension calibration, factors such as line top edge rounding, line sidewall angle, and line bottom foot all result in apparent broadening of the intensity transition at the edges. This inevitably results in ambiguity in image pixel dimension calibration.

In U.S. Pat. No. 5,043,586 to Giuffre, et al., electron beam lithography grids are described having grid lines coplanar with the surface of the grid body and laterally supported by grooves formed in the grid body. An oxide layer is etched through to or somewhat beyond the substrate surface by Reactive Ion Etching (RIE) forming an intaglio or engraved pattern in the substrate. The remainder of the resist is removed and further RIE etching is done using the oxide mask to fully form grooves. A dense metal such as gold or tungsten is layered over the surface of the substrate including the grooves. The choice of material is based on the contrast of electron backscattering relative to the substrate material. The described prior art includes a calibration grid formed by an array of orthogonal, raised lines of gold on a substrate or body which is typically of silicon or similar semiconductor material. Measurement of beam position is accomplished by detecting changes in backscattering of electrons as the beam is swept across the calibration grid. The process of fabricating the calibration grids typically includes the formation of a multilayer resist including a stand-off layer, placed on the grid surface of a substrate, an intervening layer placed on the stand-off layer and an imaging layer placed on the intervening layer. To improve adhesion of gold to areas of the substrate or body, it is common to also include a thin layer of chromium between the surface of the substrate, either before applying the resist or at least before deposition of the gold. The grid is highly conductive to avoid electrical charges which can cause local deflection of the electron beam, causing significant errors in calibration.

U.S. Pat. No. 6,420,703 to Wu, et al. describes a method for forming a critical-dimension scanning electron microscope (CD-SEM) calibration standard with a plurality of metal lines formed of a suitable metal such as W, Pt, Au, Ta or Ti. The calibration standard is formed by a focused ion beam technique to produce straight, narrow lines. The substrate that has a planar top surface and the metal lines are formed on the planar top surface.

In U.S. Pat. No. 6,420,702 to Tripsas, et al., an SEM measurement standard utilizes two different conducting materials in order to prevent charging effects. The top material is selected to use grain morphology to focus secondary electrons, and to obtain improved image contrast. The lines are raised above the surrounding surface.

U.S. Pat. No. 5,528,047 to Nakajima describes an electron beam exposure apparatus with a stage including a reference marker composed of a base section and a projecting section. The base section is formed of a thin film of first conductive element having an atomic number (Z) greater than that of a material of the stage and has a first thickness through which more than 70% electrons in the beam can transmit. The projecting section is raised above the surrounding surface and is formed of a bulk of second conductive element having an atomic number equal to or greater than that of the material of the stage. The projecting section is made of a heavy material such as tungsten (W) having an atomic number greater than that of the material of stage. The heavy material effectively reflects electrons of an incident electron beam. The projecting section needs to be conductive. Tantalum (Ta), molybdenum (Mo), and chrome (Cr) or their alloys are also suggested as alternatives to tungsten.

High atomic number metal elements are described as electron beam registration alignment marks on low atomic number substrates in U.S. Pat. No. 4,123,661 to Wolf, et al. The combination produces enhanced secondary and back-scattered electron video signals over topographical alignment marks of homogeneous materials. To augment the enhanced signal contrast, pairs of alignment marks are placed very close together to enhance the signal contrast. High atomic number materials, such as tantalum, tungsten, rhenium, osmium, iridium, platinum, gold and thallium are suggested for use on substrate materials of low atomic numbers, such as silicon, gallium arsenide and germanium. The alignment marks are shown embedded in photoresist.

Calibration standards are commercially available from Electron Microscopy Sciences in Hatfield, Pa. One of their products is an MXS 301BE which has alternating lines of two different elements which is said to provide excellent image contrast, and the titanium layer thickness is kept to 20 nm to control edge distortion effects in the SEM image. These physical characteristics make the edges sharp and readily discernable. The pattern is a direct recording of a laser-generated interference pattern which has been transferred into the 20 nm thick titanium film.

SUMMARY OF THE INVENTION

The invention includes a method of making and using thin film calibration features for use in a fabrication process for magnetic heads. The invention uses materials and techniques which are commonly used in making magnetic heads so that the calibration features can conveniently be produced by the same equipment used to manufacture the heads. Materials with significantly different atomic numbers are used to provide contrast for defining visible edges for use in calibration of image-based metrology systems such as scanning electron microscopes and focused ion beam (FIB) systems. To fabricate a calibration standard according to the invention raised features are first formed from an electrically conductive material with a selected atomic number. NiFe alloy is a convenient choice, since it is used in the manufacturing process for magnetic heads. The raised features are formed using photolithography to have precise relationships suitable for use as calibration standards. The raised features can be formed by selectively milling into a planar layer of material through voids in a photoresist mask or by depositing material into voids in the photoresist mask. A conformal thin film layer is deposited over the exposed sidewalls of the raised features. The sidewall material is selected to have a different atomic number and is preferably a nonconductive material (insulator) such as silicon dioxide or alumina which are widely used in magnetic heads. The nonconductive layer is thin, for example, about 30 nm or less, and it can be deposited through the common deposition methods like the atomic layer deposition (ALD) or ion beam deposition (IBD). After deposition of the nonconductive material, a controlled directional RIE process is used to remove the nonconductive layer deposited on the horizontal surfaces, i.e., the areas parallel to the wafer plane, leaving some of the nonconductive material remaining on the sidewalls. The remaining spaces (voids) between the sidewalls of the raised features are filled with a conductive material which can be the same as or different from the conductive material used for the raised features. For example, two different compositions of NiFe can be used. The wafer is then planarized with chemical mechanical planarization (CMP) to expose the nonconductive sidewall material on the surface. The nonconductive sidewall material will appear as fine lines embedded in conductive material. The features are defined by photolithography, so any shape can be used. The patterns can be lines, as well as, geometric structures with selected angles which can serve as angle calibration aids in the measurement of angles of thin film structures. The cross-section of the finished planarized structure can be exposed by slicing the wafer or milling a trench into the wafer surface.

The calibration features can be formed on a dedicated calibration wafer or they can be formed in used areas on wafers on which production thin film devices are being fabricated. For example, the calibration features could be located close to the magnetic heads or in the area adjacent to the printing field alignment structures on the wafer.

DETAILED DESCRIPTION OF THE INVENTION AND THE PREFERRED EMBODIMENTS

Figure 12:
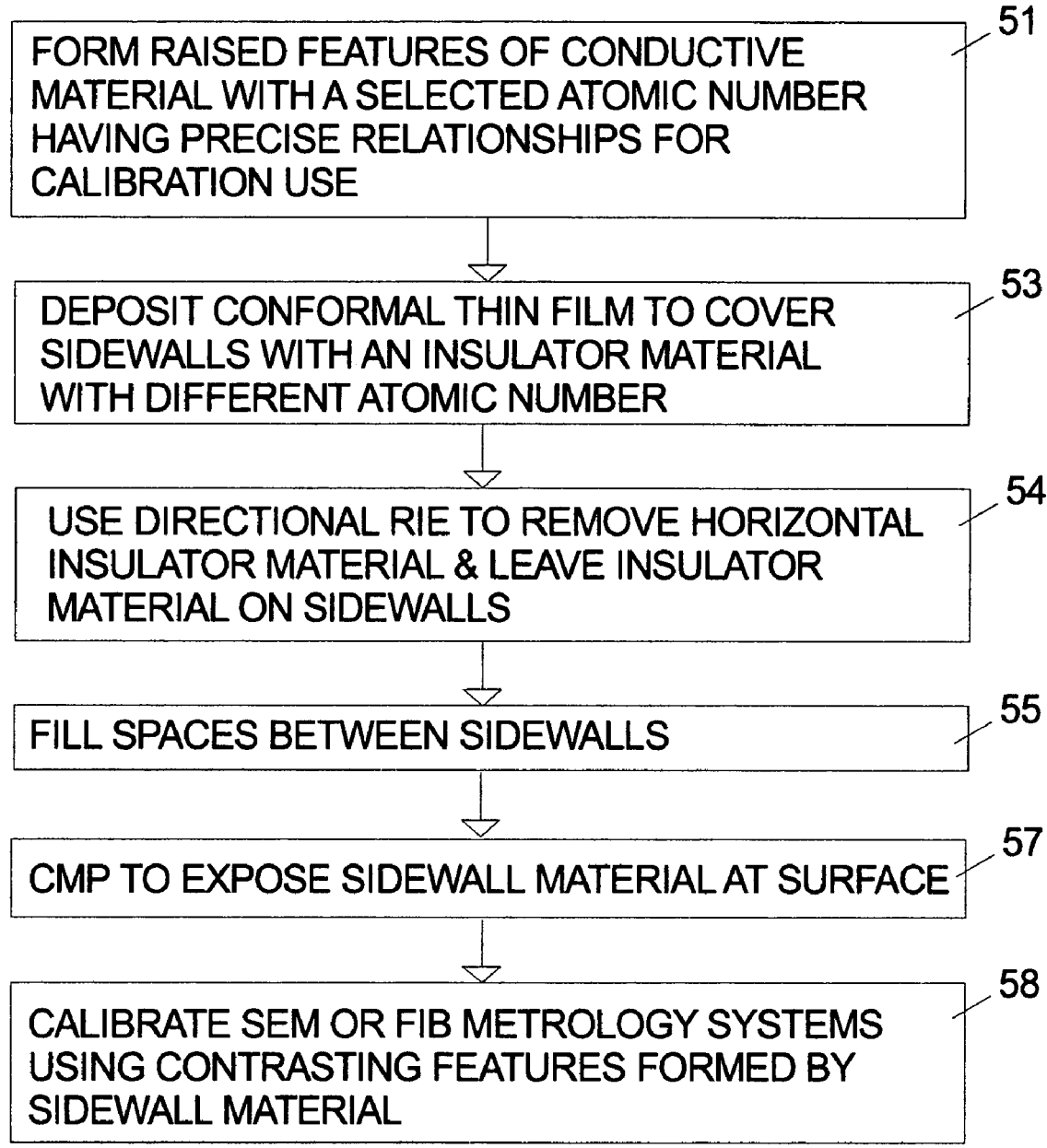
FIG. 12 is a flowchart of an embodiment of the method of the invention which covers both the first and second embodiments described herein.

FIG. 12 is a flowchart of an embodiment of the method of the invention which covers both the first and second embodiments described herein. In each of the described embodiments raised features are formed from an electrically conductive material with a selected atomic number 51. The raised features are formed using photolithography to have precise relationships which can be used as calibration standards. The features can be formed by ion milling into a planar layer of material or by depositing into voids in a photoresist. A conformal thin film layer is deposited over the exposed sidewalls of the raised features 53. The sidewall material is selected to have a different atomic number and can be an a nonconductive material. The sample after conformal thin film deposition goes through the directional RIE which selectively removes the thin deposition layer on the horizontal surfaces and only leaves the thin nonconductive film on the sidewall portion 54. Another seed layer is deposited after the RIE, and the remaining spaces between the sidewalls of the raised features are filled 55. The wafer is planarized with CMP to expose the sidewall material on the surface 57. The thin nonconductive layer provides the contrast enhanced lines for edge definition. The charging of the structure is negligible under the electron/ion beam irradiation, since the nonconductive layer is thin and the second plated layer is connected to the first layer through the trench bottom in which a conducting ground path is joined between the two plated layers. The calibration features are used to calibrate SEM and FIB systems 58.

The calibration features of the invention can be produced by a variety of standard photolithographic and thin film processing techniques. Many combinations of suitable materials having different atomic numbers can be used. For example, in one embodiment trenches are etched into the silicon wafer with highly doped top layer as the first conducting material layer and refilled with a metal such as tungsten or rhodium. Silicon dioxide, alumina, carbon, tantalum, chromium and photoresist are commonly used in the manufacturing process for thin film magnetic heads used in disk and tape drives and can conveniently be used to make the calibration features according to the invention.

Figure 1:
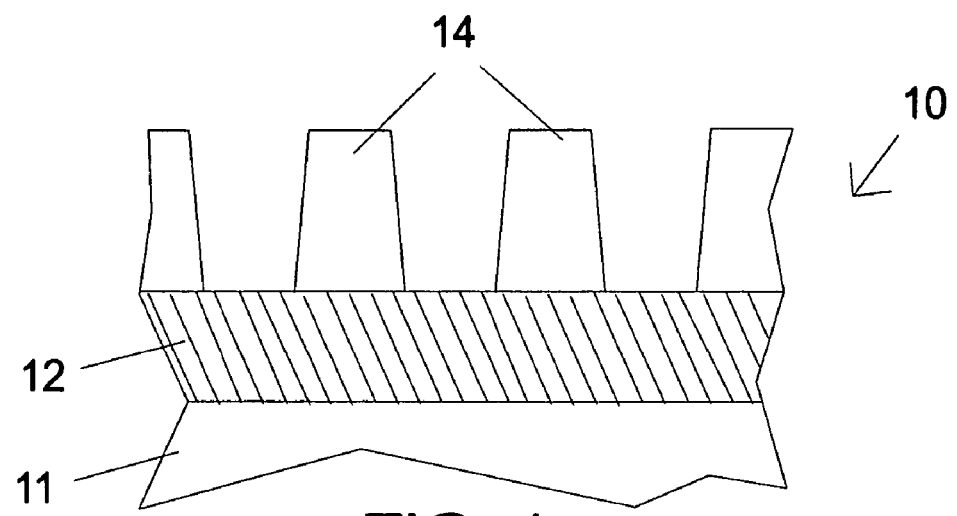
FIG. 1 is an illustration of a section of a wafer taken perpendicular to the surface of the wafer and the plane of the thin films on which a photoresist has been patterned on a layer of metal according to a first embodiment of the invention.
Figure 2:
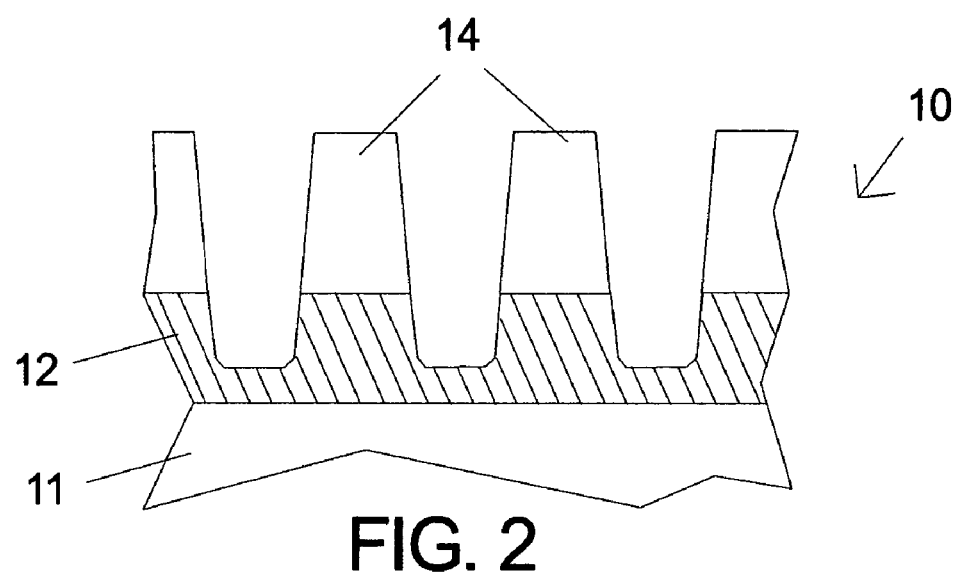
FIG. 2 is an illustration of a section of a wafer subsequent to the state of the process shown in FIG. 1 after trenches have been ion-milled into the metal according to a first embodiment of the invention.
Figure 3:
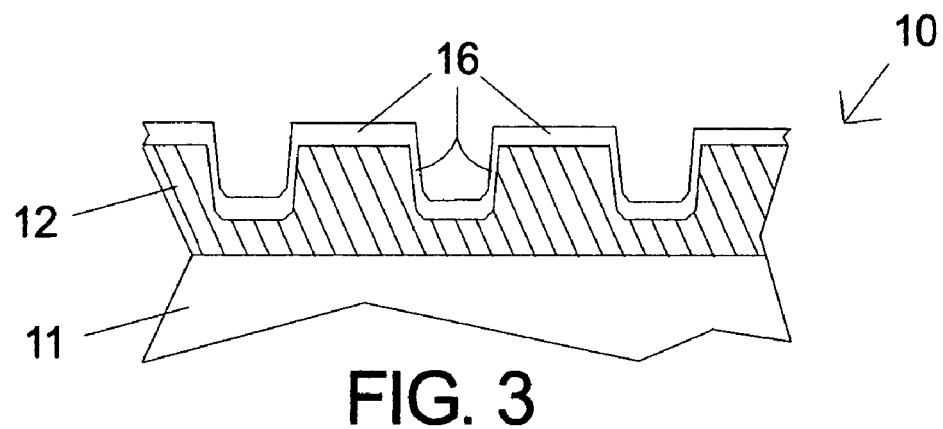
FIG. 3 is an illustration of a section of a wafer subsequent to the state of the process shown in FIG. 2 after the photoresist has been stripped and a conformal thin film of nonmetallic material has been deposited according to a first embodiment of the invention.
Figure 4:
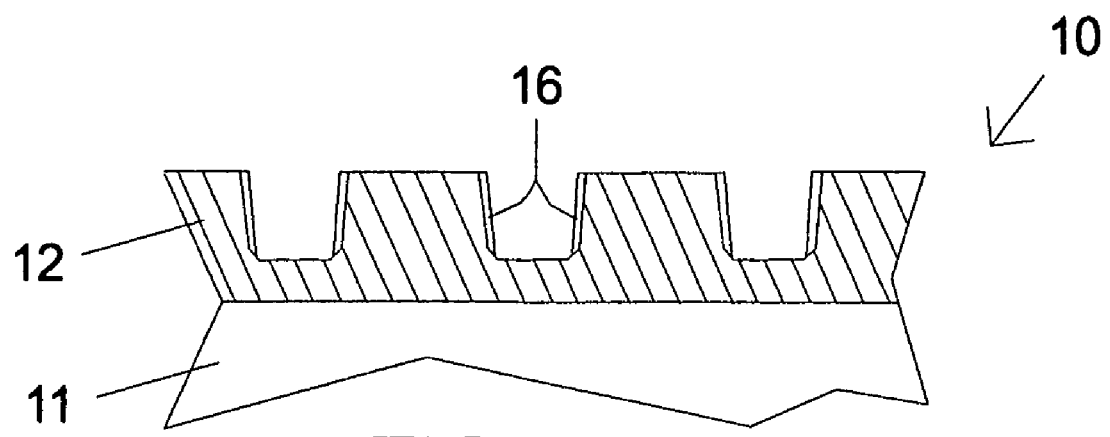
FIG. 4 is an illustration of a section of a wafer subsequent to the state of the process shown in FIG. 3 after the wafer has been processed by directional RIE according to a first embodiment of the invention.
Figure 5:
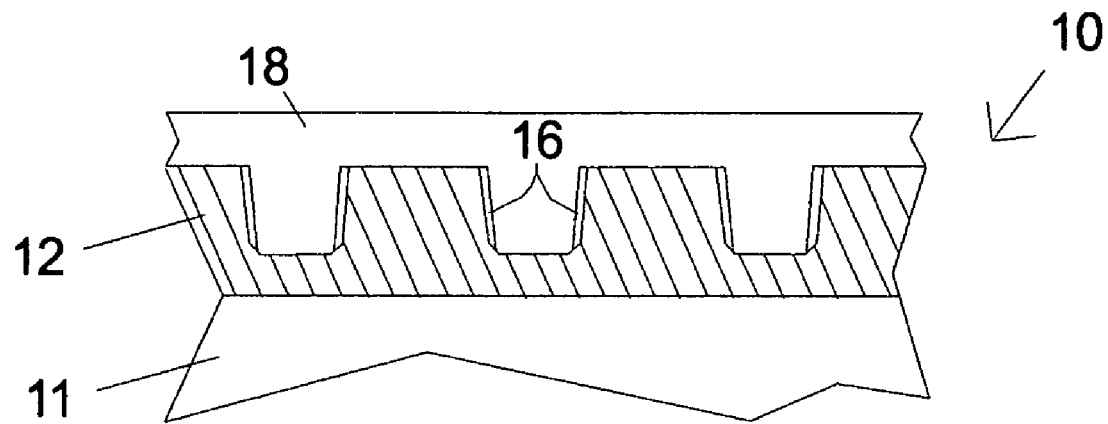
FIG. 5 is an illustration of a section of a wafer subsequent to the state of the process shown in FIG. 4 after a conductive plating seed layer has been deposited and a second metal layer has been electroplated over the wafer according to a first embodiment of the invention.
Figure 6:
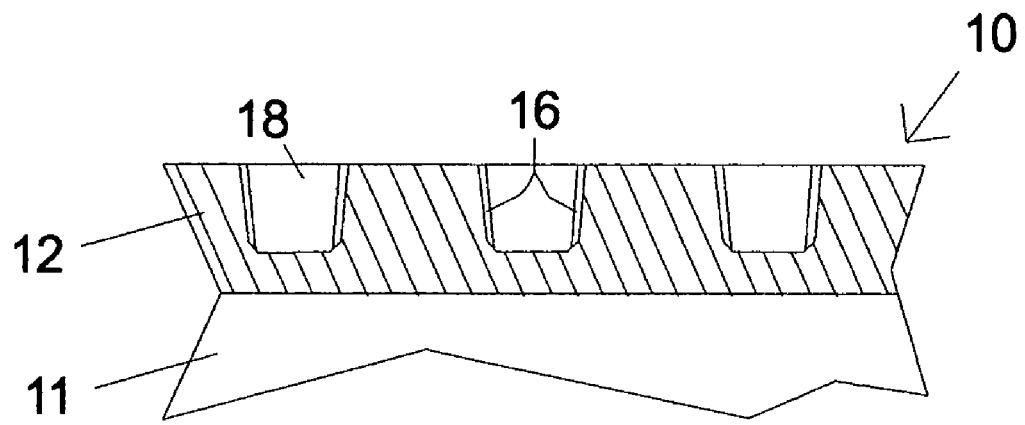
FIG. 6 is an illustration of a section of a wafer subsequent to the state of the process shown in FIG. 5 after the wafer has been planarized to expose the nonmetallic sidewall material according to a first embodiment of the invention.

One embodiment will be described in which a photoresist mask 14 is patterned on wafer 10 as shown in FIG. 1. The thicknesses of the structures in the figures are not according to scale since the large range of sizes would make the drawing unclear. Where appropriate the actual approximate sizes and thicknesses will be noted. The view shown is a section taken perpendicular to the wafer surface. The surface material 12 is preferably NiFe alloy plated on a substrate 11 which is preferably a silicon or ceramic wafer with seed layer deposited atop for NiFe. The NiFe is relatively thick preferably being on the order of 1-2 microns thick. The pitch of the line features is preferably from 100-600 nm. FIG. 2 shows the wafer after ion milling has formed trenches in the NiFe area exposed in the photoresist mask 12. The photoresist is stripped after ion milling and a thin layer of a nonmetallic material 16, preferably silicon dioxide or alumina, is deposited over the wafer as shown in FIG. 3. The nonmetallic material is preferably thinner than the NiFe layer. A thickness of 10 to 30 nm is reasonable. Next the wafer is processed with a directional, reactive-ion etching (RIE) step to remove the horizontally disposed areas of the nonmetallic material 16 as shown in FIG. 4. The directional RIE is tuned so that it removes the horizontal areas of the nonmetallic material lot more aggressively than the vertical, sidewall areas. The RIE is timed to stop when the majority of the wafer horizontal nonconductive material has been etched. The nonconductive material in the horizontal areas can be completely removed, but it is acceptable for some of the horizontal material to remain. Since the nonmetallic layer in the horizontal areas does not need to be totally etched away, the process window for this etch step is wide. After the RIE has been completed, a seed layer (not shown) is deposited. The seed layer is preferably sputtered deposited NiFe. A second layer of NiFe 18 is deposited preferably by electroplating. The result is shown in FIG. 5. The sidewall deposits of nonmetallic material are now embedded in NiFe. The wafer is then processed by chemical-mechanical polishing (CMP) to remove the NiFe above the sidewall deposits. The result is shown in FIG. 6.

An embodiment of the calibration structure according to the invention could have lines of NiFe in the pitch range of 100-600 nm separated by lines of nonmetallic material approximately less than 30 nm wide. The sidewall nonmetallic material will typically be much thinner than in the horizontal areas; therefore, if the nonmetallic layer is deposited to approximately 30 nm, the final sidewall thickness should be less. The directional RIE will thin the sidewalls to some extent less than 10 nm and shown as dark thin lines defining the profile edges under electron and ion beam imaging conditions. The alternating NiFe lines are deposited in two phases. The width of the first set of lines as shown in FIG. 2 is determined by the photoresist mask 14. The width of the second set of NiFe lines is determined by the spacing between the first set of lines and the thickness of the remaining sidewall material. Preferably the two set of lines are made to have the same width so that they are essentially indistinguishable in the in the SEM image but this is not the limitation since the pitch dimension will not change if the line-to-space ratio of the first NiFe layer is designed not to be 1. During the image pixel calibration, the pitch is now defined by the distance measured on the same edge side between every other thin dark line in the electron beam or ion beam image. The pitch is from the left edge of the first dark line to the left edge of the third dark line, or from the right edge of the first dark line to the right edge of the third dark line. Also the second and fourth dark lines can be used in the same way. If the dark lines are very thin, i.e., the thickness after RIE is only 2 to 3 nm thick, the center of the dark lines can be used for pitch definition.

The use of NiFe separated by nonmetallic lines such as silicon dioxide or alumina provides enhanced contrast in the SEM or FIB image due to the significantly different atomic numbers that these materials have. NiFe and silicon dioxide and/or alumina are commonly used for various layers in magnetic heads. Sputtering, electroplating and RIE are also commonly used; so it is convenient for fabrication facilities for magnetic head to make the calibration structures according to the invention. The surface of the calibration features is planar and are easily cleaned by ashing to remove carbon contamination introduced by SEM imaging so that a calibration wafer according to the invention can be used repeatedly.

Figure 7:
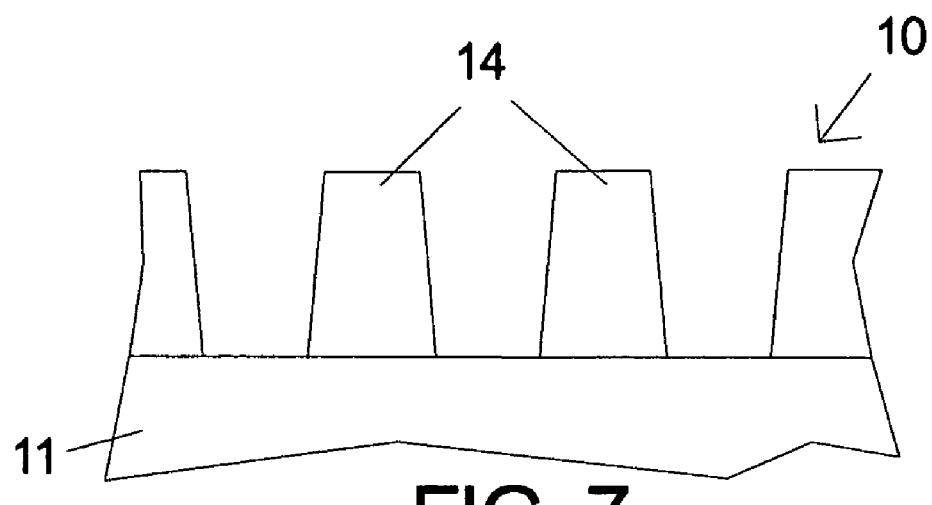
FIG. 7 is an illustration of a section of a wafer after a plating seed layer has been deposited onto the substrate and a photoresist mask has been patterned on the wafer according to a second embodiment of the invention.

FIG. 7 illustrates a second embodiment of the invention which also starts with the patterning of the photoresist mask 14, but in this embodiment the mask is formed on substrate 11. The first layer of NiFe is formed by deposition of the seed layer (not shown) followed by the electroplating of NiFe 21. The plating seed layer is deposited onto the substrate prior to the photoresist application.

Figure 8:
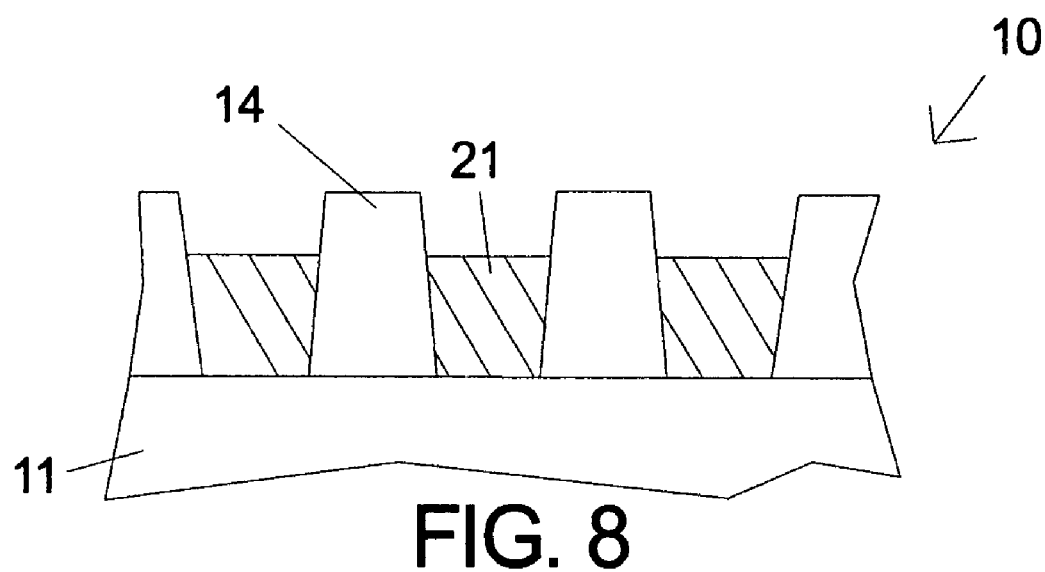
FIG. 8 is an illustration of a section of a wafer subsequent to the state of the process shown in FIG. 7 after a second metal layer has been electroplated over the wafer according to a second embodiment of the invention. The plating of the second metal layer is controlled that the photoresist trenches are not over plated, i.e., the second metal layer is plated up to the 60-80% of the photoresist layer thickness.
Figure 9:
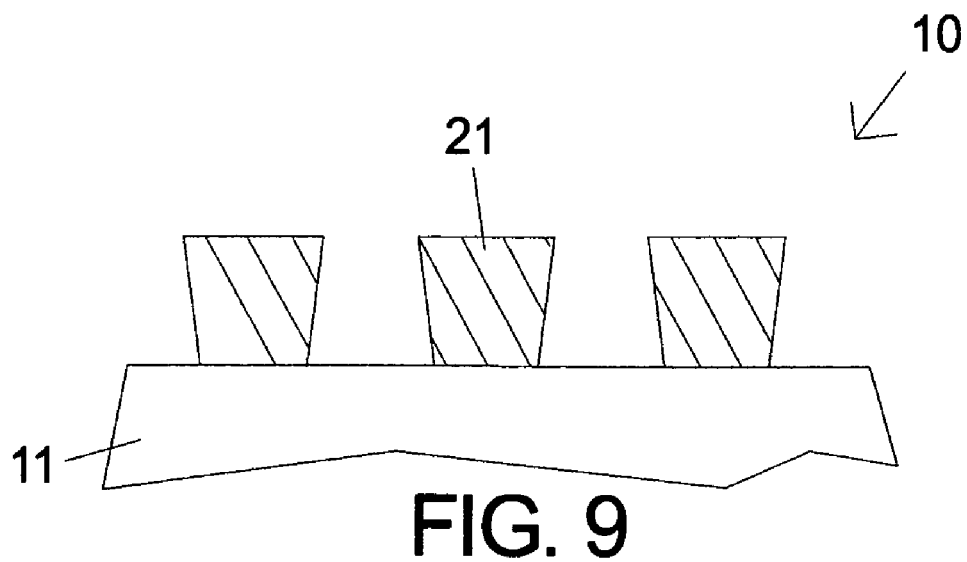
FIG. 9 is an illustration of a section of a wafer subsequent to the state of the process shown in FIG. 8 after the photoresist has been stripped from the wafer according to a second embodiment of the invention.
Figure 10:
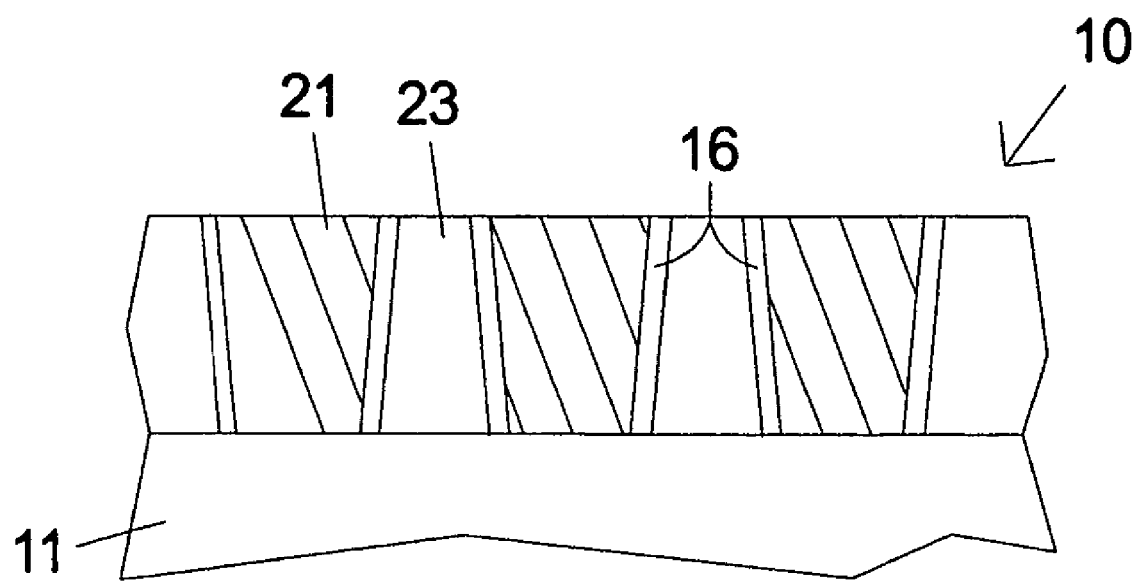
FIG. 10 is an illustration of a section of a wafer subsequent to the state of the process shown in FIG. 9 after a thin nonconductive layer has been deposited, followed by plating seed layer deposition and the subsequent plating and CMP steps. The wafer has been planarized to expose the nonmetallic sidewall material according to a second embodiment of the invention.

The result is shown in FIG. 8. After the photoresist is stripped the lines of NiFe 21 remain as shown in FIG. 9. The process steps from this point forward are the same as for the first embodiment. The final result is shown in FIG. 10. The nonmetallic sidewall material 16 separates the NiFe lines 21, 23 which were formed in two phases. As in the first embodiment, a final CMP is executed to expose the nonmetallic lines 16.

Figure 11:
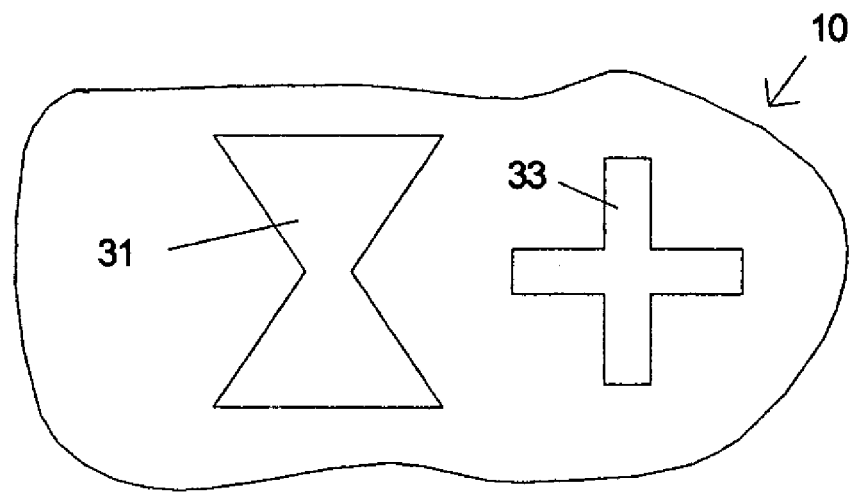
FIG. 11 is an illustration of a plan view of a wafer with sample angular patterns according to an embodiment of the invention.

FIG. 11 is an illustration of a plan view of a wafer with patterns according to an embodiment of the invention. Since the shape of the calibration features are determined by the photoresist mask, arbitrary shapes are possible as shown. The lines in FIG. 11 are the exposed sidewall material. Feature 31 illustrates a structure with angles that can be used to calibrate the measurement of angles of thin film structures. Feature 33 is a plus-sign pattern. The conventional pattern, a set of equally spaced parallel lines, can be made according to the invention as well.

The material compositions have been given without regard to the small amounts of contamination which are invariably present as is known to those skilled in the art. Although the embodiments of the invention have been described in particular embodiments those skilled in the art will recognize that the invention may be used in other embodiments.

The invention claimed is:

1. A method of fabricating thin film calibration features on a wafer comprising the steps of:
    forming raised structures having sidewalls, the raised structures being an electrically conductive material and forming a calibration pattern;
    depositing a nonconductive material over the wafer and on the sidewalls of the raised structures;
    filling spaces between the sidewalls with a conductive material; and
    planarizing the wafer to expose the nonconductive material on the sidewalls disposed between conductive material of the raised structures and the conductive material filling spaces between the sidewalls.

2. The method of claim 1 further comprising the step of directionally reactive-ion etching the nonconductive material to thin or remove the nonconductive material which is not disposed on the sidewalls prior to the step of filling spaces between the sidewalls.

3. The method of claim 2 wherein the nonconductive material on the sidewalls is less than 30 nm thick after the step of directionally reactive-ion etching the nonconductive material is completed.

4. The method of claim 1 wherein the conductive material in the raised structures is NiFe.

5. The method of claim 1 wherein the nonconductive material is silicon dioxide or alumina.

6. The method of claim 1 wherein the calibration pattern has angles for calibrating measurement of angles of thin film features.

7. The method of claim 1 wherein the step of forming raised structures having sidewalls further comprises the steps of:
    electroplating a layer of NiFe on the wafer;
    patterning a photoresist mask on the wafer with voids between areas selected for the raised structures; and
    milling trenches into the layer of NiFe through the voids in the photoresist mask.

8. The method of claim 1 wherein the step of forming raised structures having sidewalls further comprises the steps of:
    patterning a photoresist mask on the wafer with voids in areas selected for the raised structures;
    depositing a layer of NiFe in the voids to form the raised structures having sidewalls; and
    removing the photoresist mask to expose the sidewalls of the raised structures.

9. A wafer with calibration features comprising:
    a calibration pattern formed by thin film sidewall material exposed on a surface of the wafer, the thin film sidewall material being composed of a nonconductive material and being embedded in conductive material that abuts the sidewall material on two opposing sides, and the surface of the wafer being planar.

10. The wafer of claim 9 wherein the nonconductive material is silicon dioxide or alumina.

11. The wafer of claim 9 wherein the conductive material is NiFe.

12. The wafer of claim 9 wherein the calibration pattern has angles for calibrating measurement of angles of thin film features.

* * * * *